United States Patent [19]

Page

[11] Patent Number: 5,750,276
[45] Date of Patent: May 12, 1998

[54] TREATMENTS FOR CONCRETE

[75] Inventor: Christopher Lyndon Page. Birmingham, United Kingdom

[73] Assignee: Tarmac Construction Limited, West Midlands, United Kingdom

[21] Appl. No.: 244,959

[22] PCT Filed: Dec. 17, 1992

[86] PCT No.: PCT/GB92/02345

§ 371 Date: Sep. 8, 1994

§ 102(e) Date: Sep. 8, 1994

[87] PCT Pub. No.: WO93/12052

PCT Pub. Date: Jun. 24, 1993

[30] Foreign Application Priority Data

Dec. 19, 1991 [GB] United Kingdom ............ 9126899

[51] Int. Cl.$^6$ ............................................ B32B 17/00
[52] U.S. Cl. .................. 428/703; 427/136; 427/140; 264/426; 204/157.15; 205/734
[58] Field of Search ........................ 427/140, 136; 428/703; 106/723, 737; 264/426; 204/157.15; 205/734

[56] References Cited

U.S. PATENT DOCUMENTS

| | | | |
|---|---|---|---|
| 828,976 | 8/1906 | Schneider | 106/723 |
| 4,062,913 | 12/1977 | Miller | 264/24 |
| 4,506,485 | 3/1985 | Apostolos | 52/575 |
| 4,536,417 | 8/1985 | Shimizu | 427/140 |
| 4,609,573 | 9/1986 | Omata | 427/403 |
| 4,832,803 | 5/1989 | Vennesland | 204/130 |
| 4,931,314 | 6/1990 | Takahura | 427/140 |
| 5,015,351 | 5/1991 | Miller | 204/182.2 |
| 5,021,260 | 6/1991 | Kitagawa | 427/140 |
| 5,039,556 | 8/1991 | Cogliano | 427/136 |
| 5,252,266 | 10/1993 | Brabston | 106/723 |
| 5,254,228 | 10/1993 | Westhof | 204/147 |
| 5,312,526 | 5/1994 | Miller | 204/130 |
| 5,422,141 | 6/1995 | Hoopes | 427/299 |
| 5,554,352 | 9/1996 | Jaques | 106/737 |
| 5,639,358 | 6/1997 | Bennett | 204/196 |

FOREIGN PATENT DOCUMENTS 6173472  6/1994  Japan .................. 106/723

*Primary Examiner*—Timothy Speer
*Attorney, Agent, or Firm*—Plevy & Associates

[57] ABSTRACT

This invention relates to a method of inhibiting alkali-silica or alkali-aggregate reactions (AAR/ASR) in concrete structures by introducing lithium compounds or the like in conjunction with conventional techniques for the treatment of steel reinforcement corrosion.

It is also proposed to provide lithium compounds in repair concretes, grouts or mortars and use the difference in concentration between the article under repair and the repair material to introduce the lithium ions into the concrete under repair, once again inhibiting AAR/ASR reactions.

16 Claims, No Drawings

TREATMENTS FOR CONCRETE

It is known that concretes which contain certain forms of siliceous aggregate are prone to generate expansive reaction products (alkali-silica gel) if sufficient concentrations of sodium, potassium and hydroxyl ions are present in the concrete pore liquid. This phenomenon, known as alkali-aggregate reaction (AAR) or alkali-silica reaction (ASR), can give rise to deleterious expansion and cracking of the concrete.

It has already been proposed to use lithium compounds as a means of inhibiting AAR/ASR in concretes which contain potentially reactive aggregates.

What we now propose is the introduction into, or presence of lithium ions (or the like), in hardened concrete in conjunction with specific techniques of reinforcement corrosion control or concrete repair so that the lithium ions are conveyed to local sites within the concrete where AAR/ASR is most likely to be initiated. Alternatively the lithium compounds may be introduced during the manufacture of a concrete article when using a reinforcing technique. Thus we primarily intend to use lithium ions in solutions, slurries or admixtures for treatment of existing concrete structures, but lithium ions, or the like, could be deliberately provided in the original concrete in anticipation of some form of subsequent treatment of steel reinforcement corrosion.

A number of techniques that are used for the treatment of steel reinforcement corrosion in concrete structures can cause localised enhancement of the concentrations of sodium, potassium and hydroxyl ions in the concrete pore liquid, thereby increasing the risk of expansion and cracking due to AAR/ASR in concretes that contain susceptible aggregates. (Such corrosion treatment techniques include cathodic protection, electrochemical desalination, electrochemical realkalisation, and patch repair with cementitious mortar, grout or concrete).

The invention is concerned with the application of lithium compounds in conjunction with the aforementioned techniques for the treatment of steel reinforcement corrosion, with the aim of inhibiting or preventing AAR/ASR from arising as a deleterious side-effect. The effectiveness of lithium compounds as a means of inhibiting or arresting AAR/ASR in concretes which contain potentially reactive aggregates is thought to depend on the formation at the aggregate surface of an insoluble lithium silicate which has little tendency to expand in the presence of water.

According to a first aspect the invention comprises the use of lithium (or the like) compounds as inhibitors of alkali-aggregate/alkali-silica reactions in reinforced concrete subjected to cathodic protection, electrochemical desalination, electrochemical realkalisation, or patch repair treatments.

According to a second aspect the invention consists in a method of reducing AAR/ASR in concrete which is reinforced comprising the steps of providing mobile lithium ions in the concrete, and passing an electrical current through the concrete and/or reinforcement.

According to a third aspect the invention consists in a method of producing reinforced or prestressed concrete comprising the steps of providing metal reinforcing within the concrete, providing mobile lithium ions in or on the concrete, and ensuring that an electrical current is applied to the concrete and/or reinforcing.

In this way lithium ions may conveniently be introduced to a structure during its construction so that they are present if an electric current is passed at any stage during the life of a concrete structure.

Preferably the methods comprise arranging for the lithium ions to be conveyed to specific local sites within the concrete. The concrete thus has regions of high lithium concentration and regions of low lithium concentration.

According to a fourth aspect the invention consists in applying to concrete a chemical which contains a substance which migrates in an electric field through the concrete and which is attracted to regions of the concrete where AAR/ASR are likely to occur, and which preferentially reacts at said regions to form an insoluble second substance which does not expand substantially in the presence of water.

According to a fifth aspect the invention consists in a method of repairing concrete structures by applying repair substances which incorporate lithium compounds to the concrete structure so that lithium ions diffuse into substrate concrete adjacent to areas subject to repair so as to inhibit AAR/ASR in the substrate concrete.

According to a sixth aspect the invention comprises a concrete article or structure having regions of high concentration of lithium ions (or the like) and/or regions of low concentrations of lithium ions (or the like).

Preferably the high concentration of lithium ions is present in close proximity to the sites where AAR/ASR is prevalent. Applications of the invention will now be described by way of example only.

EXAMPLE 1

Cathodic Protection of Reinforced Concrete

Cathodic protection is applied to reinforcing steel by passing electrical current between it and an extended anode system attached to the surface of the concrete. The reinforcement acts as the cathode of an electrolytic cell. The anode system may take a variety of forms such as a metallic mesh coated with a cementitious overlay, a conductive paint, a sprayed metal coating, or a conductive asphalt overlay.

The current is normally supplied continuously for the remaining service-life of the structure by means of a variable D.C. power source. The latter may be adjusted from time to time to provide a sustained level of polarisation of the steel reinforcement which is judged to be appropriate on the basis of monitoring relative to reference electrodes at various positions.

Whilst the overall average current density applied to a structure can be controlled (typical specified values being less than 20 mA/m$^2$), the current distribution to the reinforcement cannot be made entirely uniform and, in practice, local areas of the embedded steel often receive substantially higher than average current densities.

The cathodic processes which take place on the surface of the reinforcing steel, particularly in the areas of enhanced local current density, generate high local concentrations of sodium, potassium and hydroxyl ions thus increasing the risk of AAR/ASR in the vicinity of the steel. This risk may be reduced if lithium compounds (such as lithium hydroxide, lithium nitrite, lithium acetate, lithium benzoate etc) are introduced at or near the surface anode system because the positively charged Li$^+$ ions will migrate under the influence of the applied electrical field towards the steel cathode. Electromigration of Li$^+$ will tend to occur preferentially to areas of steel where the local cathodic current density is highest and where the greatest risk of AAR/ASR, therefore, exists.

Convenient ways of introducing the lithium compounds, at appropriate concentrations, will differ somewhat for different anode systems. In the cases of the metallic mesh/cementitious overlay type of anode system, incorporation of the lithium compound as an admixture in the cementitious overlay is often practicable. In the cases of conductive paint, sprayed metal, or conductive asphalt anode systems, the absorption of a solution of the lithium compound into the pre-dried concrete surface prior to the application of the anode coating would be practicable and, in certain applications, the provision of "drip-feed" mechanisms for introducing further lithium-containing solution beneath the surface anode would be possible. Other ways of introducing the lithium compounds include pumping them into the concrete.

The appropriate concentration for a system will vary for different concretes, and should preferably be determined by small scale tests. A concentration of greater than 0.1M in a cementitious overlay is believed to be suitable in some cases, although this figure may vary considerably. We would normally envisage using a concentration of less than 2M, but of course small scale tests could be used to indicate the appropriate range of suitable concentrations.

EXAMPLE 2
Electrochemical Desalination and Realkalisation of Reinforced Concrete Electrochemical desalination and realkalisation treatments applied to reinforced concrete are essentially similar to cathodic protection in that they involve the passage of a current between the steel reinforcement cathode and an anode mounted on the surface of the concrete. The anode is normally a metallic mesh, which is placed in an electrolyte (often in the form of a slurry with wood fibre pulp) in contact with the concrete surface. The main difference between these treatments and cathodic protection, as normally applied, is that they involve the passage of much larger current densities (circa 1 A/m$^2$) for shorter times (usually no longer than a few months in total). The cathodic processes which take place on the surface of the reinforcing steel again generate high local concentrations of sodium, potassium and hydroxyl ions thus enhancing the risk of AAR/ASR in the vicinity of the steel. The introduction of lithium compounds (such as lithium hydroxide, lithium nitrite, lithium acetate, lithium benzoate or other soluble lithium compounds) into the electrolyte surrounding the anode and/or the concrete provides a simple and convenient method of reducing this risk because positively charged Li$^+$ ions will migrate rapidly under the influence of the applied electrical field towards the steel cathode, as in the case of cathodic protection.

As previously mentioned it is believed that the lithium ions react preferentially with the siliceous aggregate to give an insoluble lithium silicate at the aggregate surface which does not expand anything like as much as an alkali-silica gel in an alkali-silica reaction.

Since the introduction of lithium (and any other mobile ions) tends to reduce the transport number of chloride ions, the time required for effective electrolytic desalination of reinforced concrete structures may be increased somewhat when lithium-based electrolytes are employed as described above. Small scale trials can be used to ascertain whether this is likely to cause practical difficulties in the cases of particular structures. In circumstances where it appears that treatment times will be extended to an inconvenient degree, it can be advantageous to carry out electrolytic desalination as a two stage process with water and an aqueous solution containing lithium ions as the external electrolytes in the anode slurry for the two stages.

EXAMPLE 3
Patch Repairs with Cementitious Mortars, Grouts and Concretes

Concrete structures which have become cracked, either as a consequence of reinforcement corrosion or by other means, such as mechanical damage, are often repaired by removing the loose (or otherwise suspect) material and patching the affected regions with cementitious mortars, concretes etc. In cases where the repair material contains higher concentrations of alkalis (i.e. sodium, potassium and hydroxyl ions) than the substrate concrete, diffusion of these alkalis from the repair into the surrounding concrete will occur. This leads to an enhanced risk of AAR/ASR occurring around the repaired region in cases where the substrate concrete contains susceptible aggregates.

This risk may be conveniently reduced by the incorporation into the repair material of controlled quantities of lithium compounds (such as lithium hydroxide, lithium nitrite, lithium acetate, lithium benzoate etc) as admixtures. The concentration of Li$^+$ in the pore solution of the cementitious repair material must be sufficient to ensure that its diffusion into the surrounding substrate concrete is rapid relative to the rates of diffusion of Na$^+$ and K$^+$ from the repair material. The anions associated with the lithium compounds used must not be of sorts (eg. Cl$^-$, SO$_4^-$ etc) that are likely to cause any deleterious effects on the durability of the repair material or the surrounding concrete or its reinforcement. It may be advantageous to employ lithium compounds in which the anion (e.g. hydroxide, nitrite, benzoate, acetate etc) functions as an inhibitor of steel corrosion since this provides enhanced protection to the steel reinforcement in the vicinity of the repairs.

As for any admixtures, it is necessary to establish the effects of the lithium compounds on basic properties (eg workability, setting and hardening characteristics etc) by preliminary tests with the cementitious repair materials to be used for particular patch repairs.

I claim:

1. A method of inhibiting one of alkali-aggregate or alkali-silica reactions in hardened concrete which comprises the steps of introducing a substance into the concrete and applying an electric field to the concrete after it hardens to cause the substance to migrate within the hardened concrete, wherein the substance inhibits one of alkali-aggregate or alkali-silica reactions in the hardened concrete.

2. A method according to claim 1 wherein the step of applying causes the substance to migrate preferentially to areas highly susceptible to one of alkali-aggregate or alkali-silica reactions.

3. A method according to claim 1 wherein the electric field is applied as a function of reinforcement corrosion control.

4. A method according to claim 1 wherein the substance which migrates reacts with aggregates present in the concrete to form a second substance.

5. A method according to claim 4 wherein the second substance forms on the surface of the aggregate.

6. A method according to claim 4 wherein the second substance is insoluble and does not expand substantially in the presence of water.

7. A method according to claim 1 wherein the substance contains lithium ions.

8. A method according to claim 1 wherein the step of introducing includes contacting a mixture containing the substance with a surface region of the concrete.

9. A method according to claim 8 wherein the mixture is a cementitous overlay and an anode is provided in the mixture.

10. A method according to claim 1 wherein the substance is introduced into the concrete during construction.

11. A method according to claim 1 wherein the substance is present in repair material applied by way of repair to existing concrete.

12. A method according to claim 1 which further comprises the step of desalinating the concrete with water prior to introducing the migrating substance.

13. A reinforced hardened concrete article which has been treated by a method comprising the steps of introducing a substance into the concrete and causing the substance to migrate within the concrete, the substance inhibiting one of alkali-aggregate or alkali-silica reactions, wherein the substance is caused to migrate due to the presence of an electric field after the concrete has hardened.

14. A method of producing a reinforced or prestressed hardened concrete article which comprises the steps of providing metal reinforcement within the concrete, providing mobile lithium ions to the concrete and applying an electric field to the article at some stage during the life of the concrete article after it has hardened to cause the lithium ions to migrate within the concrete to positions where the ions inhibit one of alkali-aggregate or alkali-silica reactions.

15. A method of repairing a concrete article which comprises the steps of preparing a repair mix which incorporates on or more lithium compounds, applying the repair mix to the concrete article, and applying an electric field to the article after the repair mix has hardened such as to cause the lithium ions to migrate into the concrete article being repaired to inhibit alkali-aggregate or alkali-silica reactions.

16. A reinforced concrete article in combination with an applied electric field, comprising one of alkali-aggregate or alkali-silica reaction inhibitors in the concrete article, the article having regions of high inhibitor concentration and regions of lower inhibitor concentration, the concentrations of the inhibitors being highest where the current density due to the applied electric field is highest.

* * * * *